(No Model.)

H. MYERS.
WHEEL TIRE.

No. 477,774. Patented June 28, 1892.

Witnesses:
Hermann Bormann
Wm P Shiber

Inventor:
Henry Myers

UNITED STATES PATENT OFFICE.

HENRY MYERS, OF PHILADELPHIA, PENNSYLVANIA.

WHEEL-TIRE.

SPECIFICATION forming part of Letters Patent No. 477,774, dated June 28, 1892.

Application filed March 2, 1892. Serial No. 423,454. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

The object of my invention is to provide an efficient discontinuous wheel-tire used in bicycles or other vehicles.

My invention relates more particularly to that class of tires known as "hollow or inflatable tires."

My invention consists of a discontinuous wheel-tire composed of an inner elastic tube surrounded by an elastic metal webbing and an outer tire portion composed of a more or less elastic wearing material having the properties of not being easily abraded.

My invention further consists of a discontinuous wheel-tire composed of sections constituting an inner elastic tube portion, an elastic wire or other webbing surrounding said tube and inclosed in a rubber or other casting of suitable elastic material and having means for securely holding each section in or on a metal or other supporting felly.

My invention further consists of the mode of producing the tires herein described; and my invention further consists of details in constructing and applying the tire to a felly hereinafter described, and pointed out in the claims.

My invention will be more fully understood taken in connection with the accompanying drawings, forming part hereof, and in which—

Figure 1:
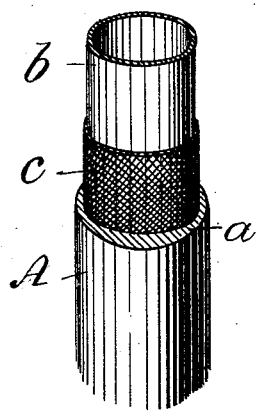
Figure 2:
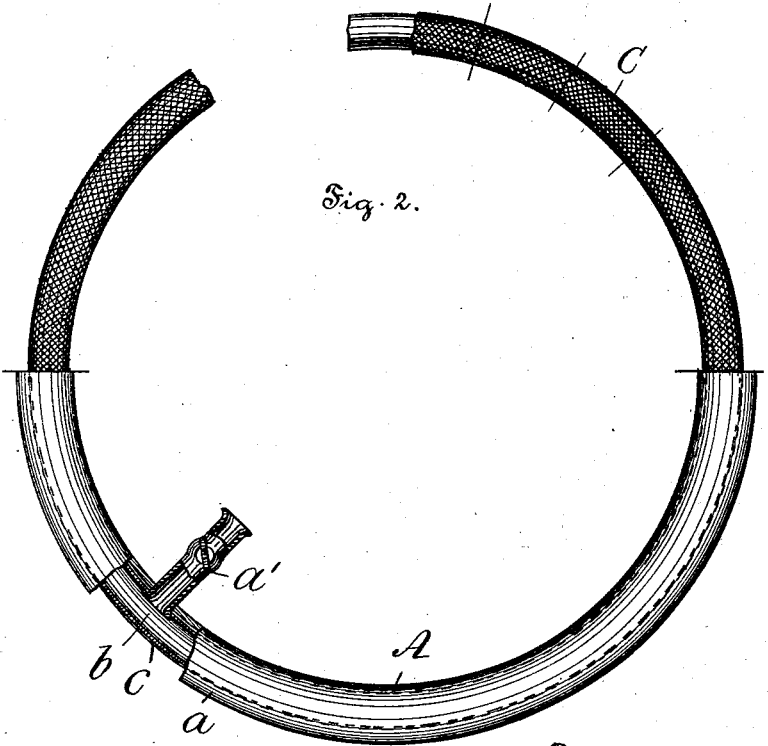
Figure 3:
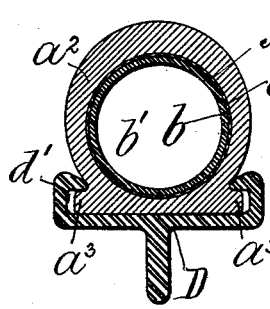

Figure 1 is a perspective view of my improved wheel-tire, composed of an inflatable inner tube surrounded by an elastic metallic webbing and enveloped by a cast tube. Fig. 2 is a view showing the mode of forming the inner tube, enveloped by an elastic metallic webbing adapted to be cut and formed into a discontinuous tire. Fig. 3 is a cross-section of a discontinuous tire embodying features of my invention; and Fig. 4 is a view, partly in elevation and partly in section, showing a discontinuous tire composed of sections.

Figure 4:
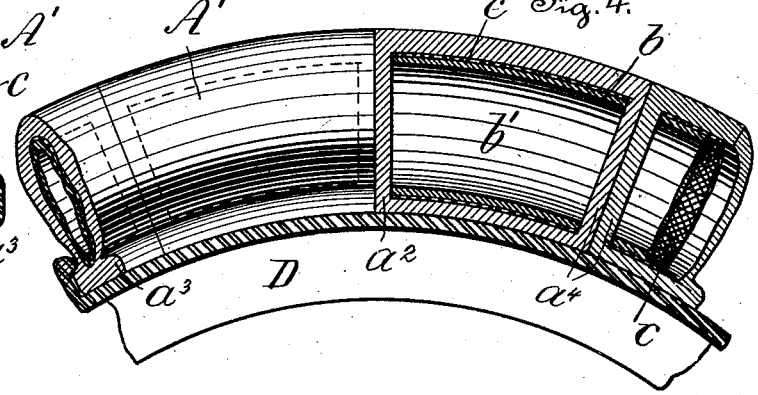

Referring now to the drawings for a further description of my invention, and more particularly to Figs. 3 and 4—A' are the sections constituting a wheel-tire A, and are composed of the inner elastic tube $b$, surrounded by the wire netted or braided tube $c$, and these tubes $b$ and $c$ are inclosed by a casting $a^2$, of rubber or other elastic material, by which the open ends of the tubes $b$ and $c$ are closed. This casting $a^2$ is provided with two projections $a^3$, adapted to be sprung into the grooves $d'$, provided on the metal or other felly D, and these grooves $d'$ and projections $a^3$ are of such dimensions that they allow of a ready withdrawal or insertion of a section A' if one or the other should become mutilated or for any reason useless.

In constructing the sectional tire A, composed of sections A', the tubular wire-netting ring $c$ and inner tube $b$ are mounted within one another and cut into segments C of suitable lengths, as shown in Fig. 2. These sections are then closed at either end by a thin rubber or other sheet pasted or otherwise fastened to the same, and are supported in a suitable mold in such a way that an elastic material $a^2$, such as rubber, having side walls $a^4$, is cast around the same, completely inclosing said tubes $c$ and $d$ and leaving the hollow space $b'$. These sections may be made of the required or any preferred resiliency by selecting the proper wire or other netting or webbing $c$ and making the walls of the casting $a^2$ of the desired thickness. The sections A' may further be expanded by inclosing a little carbonate of ammonia in the tube, which after volatilization expands the section according to its quantity.

Having thus described the nature and object of my invention, what I claim as new, and desire to secure by Letters Patent, is—

1. A sectional wheel-tire comprising a number of sections, each composed of an elastic inner tube, an elastic-webbed metal tube, and an outer casing cast to said tubes and completely inclosing the same, said outer casting provided with flanges adapted to hold said sections onto a metal tire, substantially as and for the purposes set forth.

2. A wheel-tire comprising a number of sections, each composed of an elastic inner tube, an elastic-webbed metal tube, and an outer casing cast to said tubes and completely inclosing the same, said casing provided with flanges adapted to readily engage and disengage the flanges of a felly, substantially as and for the purposes set forth.

In witness whereof I have hereunto set my signature in the presence of two subscribing witnesses.

HENRY MYERS.

Witnesses:
WM. P. SHIBERT,
ADAM C. ACKERMAN.